US 6,668,394 B2

(12) United States Patent
Walpin

(10) Patent No.: US 6,668,394 B2
(45) Date of Patent: Dec. 30, 2003

(54) CONVERTIBLE COUCH BED

(76) Inventor: Lionel A. Walpin, 127 W. Hazel St., Inglewood, CA (US) 90302

( * ) Notice: Subject to any disclaimer, the term of this patent is extended or adjusted under 35 U.S.C. 154(b) by 0 days.

(21) Appl. No.: 09/876,729

(22) Filed: Jun. 6, 2001

(65) Prior Publication Data

US 2002/0185072 A1 Dec. 12, 2002

(51) Int. Cl.[7] ............................................. A01K 29/00
(52) U.S. Cl. ........................ 5/17; 5/28; 5/722; 119/28.5
(58) Field of Search ............................... 5/12.1, 17, 28, 5/35, 722, 723, 655, 657, 42, 59.1; 297/105, 108, 109, 111; 119/28.5

(56) References Cited

U.S. PATENT DOCUMENTS

| | | | | |
|---|---|---|---|---|
| 1,885,974 A | * | 11/1932 | Winn | 5/723 |
| 2,046,645 A | * | 7/1936 | Mason | 5/695 |
| 2,599,396 A | * | 6/1952 | Kronheim | 5/28 |
| 3,319,273 A | * | 5/1967 | Solin | 24/432 |
| 3,740,774 A | * | 6/1973 | Powell | 297/452.16 |
| 3,742,526 A | * | 7/1973 | Lillard | 297/118 |
| 3,751,739 A | * | 8/1973 | Assmann | 297/109 |
| 3,890,658 A | * | 6/1975 | Petersilie | 5/12.1 |
| 4,835,801 A | | 6/1989 | Walpin et al. | 5/432 |
| 4,850,068 A | | 7/1989 | Walpin et al. | 5/432 |
| 4,853,993 A | | 8/1989 | Walpin et al. | 5/431 |
| 5,066,001 A | * | 11/1991 | Wilkinson | 482/52 |
| 5,088,966 A | * | 2/1992 | Suzuki et al. | 474/111 |
| 5,657,500 A | * | 8/1997 | Messina | 5/12.1 |
| 6,182,312 B1 | | 2/2001 | Walpin | 5/636 |

OTHER PUBLICATIONS

U.S. patent application Ser. No. 09/565,175, Walpin, filed May 3, 2000.
U.S. patent application Ser. No. 09/778,018, Walpin, filed Feb. 5, 2001.
U.S. patent application Ser. No. 09/606,843, Walpin, filed Jun. 28, 2000.

* cited by examiner

Primary Examiner—Michael F. Trettel

(57) ABSTRACT

A convertible couch bed (100) for pet including a frame (101) with a first cushion (102) and optionally a second cushion (103). The first cushion (102) is capable of being removed and secured adjacent to the frame (101) to provide an enlarged sleeping area. The cushions (102 and 103) are contoured cushions of varying density and/or thickness, thereby allowing for several different configurations, and maximizing the comfort and therapeutic support to individual pets based on the pets' individual needs. The frame (101) and first cushion (102) are secured to each other when in the expanded sleeping area configuration. String ties (112 & 113) and hook-and-loop fastening strips (114 & 110) are examples of mechanisms for securing the frame (101) and the cushion (102) to each other.

15 Claims, 2 Drawing Sheets

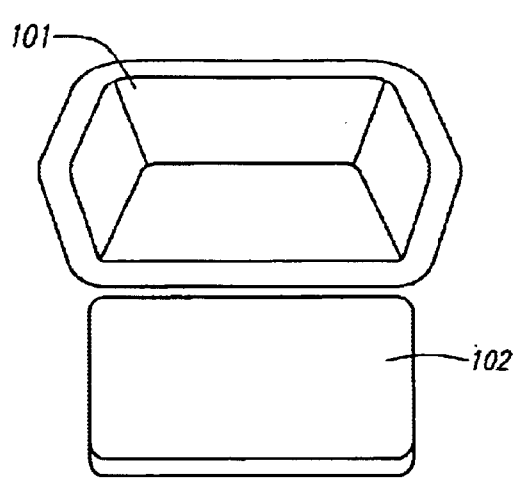
FIG. 5.
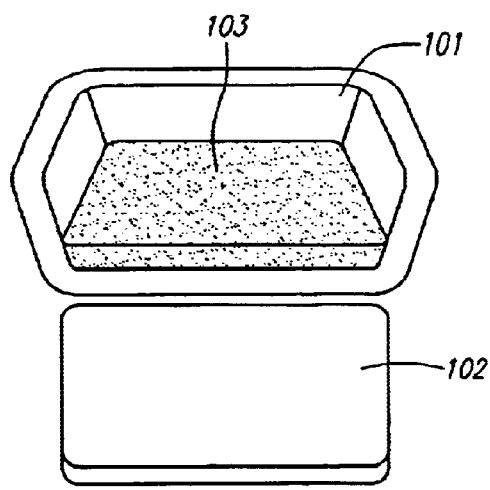
FIG. 6
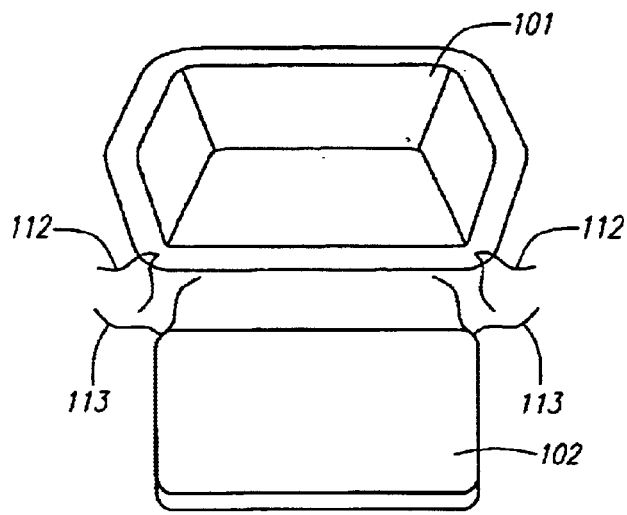
FIG. 7
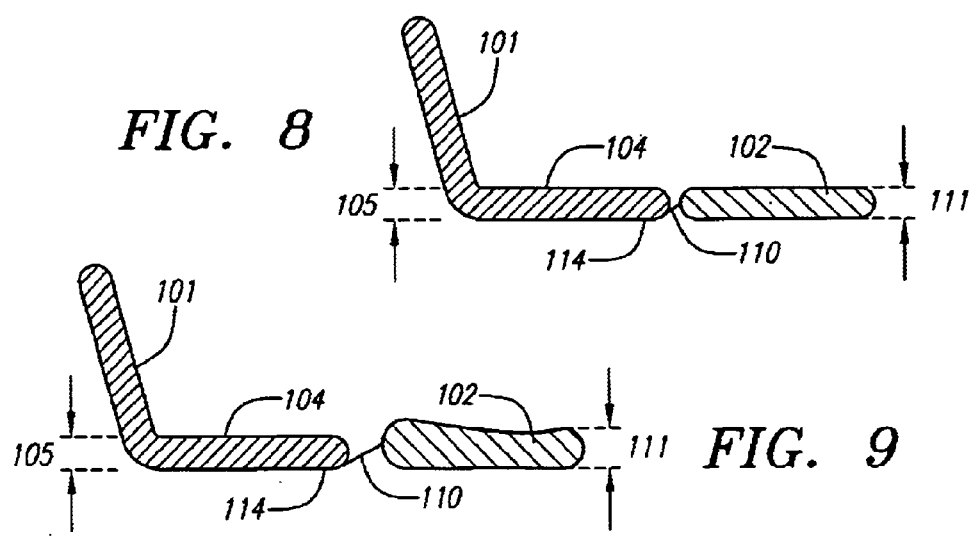
FIG. 8
FIG. 9

CONVERTIBLE COUCH BED

FIELD OF THE INVENTION

The present invention pertains generally to the field of pet products. More specifically, the present invention pertains to pet beds.

BACKGROUND OF THE INVENTION

In contemporary society, domesticated animals are gaining increased stature as personal companions. As a result of the transition from pet to companion, people are seeking means to make their animals feel more comfortable in the indoor environment of the home, leading to the creation of the field of pet furniture, specifically pet beds. One approach to the design of pet beds has been to create miniaturized versions of human furniture. This approach fails to take into account the differences in physiology and anatomy between humans and domesticated animals. While these miniaturized versions of human furniture look comfortable to humans, they may not be comfortable or physically therapeutic for pets.

In the management of human disorders that affect the musculoskeletal system, such as diseases and dysfunctions, it is important to provide patients with the comfort and therapeutic support of the musculoskeletal system. Such therapeutic support includes resting on surfaces that provide for relaxation or stretching of muscles, gapping of joints, rotation of joints, and opening of the neural foramina between the vertebrae through which the nerve roots pass. Resting on such surfaces has been shown to help to relieve pain and physical stress to nerves, muscles, and joints. Domesticated animals are subject to many of the same musculoskeletal and neurological diseases as are humans. Examples include fractures, rheumatoid arthritis, and joint replacement. Degenerative arthritis of the spine and herniation of the discs can also result in an animal developing "pinched" nerve roots. Domesticated animals are also subject to such dysfunctions as sprains and strains of muscles and joints due to single major events or repetitive minor microtrauma. Anti-inflammatory and analgesic medications are prescribed to animals, and the animals are sometimes utilized as subjects when studying the human disorders and the effects of therapeutic interventions.

Currently available pet beds fail to take an animal's therapeutic needs into consideration. The pet beds currently in the market provide flat cushions of a uniform density or stuffed cushions. These cushions do not provide adequate therapeutic support to animal's that may require it.

Accordingly, it would be advantageous to have a pet bed that was is only aesthetically pleasing to humans, but also is actually comfortable, and provides therapeutic benefits for the pets. Because of the differences between pets, it would be desirable to have a single pet bed that was capable of providing several different surfaces from which the pet could select based on comfort and support.

SUMMARY OF THE INVENTION

The present invention provides a convertible couch bed for pets, which includes a frame and a cushion. The cushion is capable of being removed and secured adjacent to the frame to provide an enlarged sleeping area. In a preferred embodiment, the cushion is a contoured cushion of varying density and/or thickness, thereby allowing for several different configurations, and maximizing the comfort to individual pets based on the pets' individual preference.

In an alternative embodiment, an additional pillow is included to provide different surfaces to support the pet.

Means of securing the cushion to the frame while in the expanded sleeping area configuration include using hook-and-loop fasteners, tie strings, etc.

BRIEF DESCRIPTION OF THE DRAWINGS

FIG. 5 illustrates the couch bed in an enlarged sleeping area configuration utilizing a single cushion.

FIG. 6 illustrates the couch bed in an enlarged sleeping area configuration utilizing two cushions.

FIG. 7 illustrates the couch bed in the enlarged sleeping area configuration, utilizing a single cushion, with fastening ties attached to the frame and the cushion.

FIG. 8 illustrates a cut-away side view of the couch bed in the enlarged sleeping area configuration, utilizing a single cushion, with the cushion thickness equal to the shelf height.

FIG. 9 illustrates a cut-away side view of the couch bed in the enlarged sleeping area configuration, utilizing a single cushion, with a cushion thickness greater than the shelf height.

DETAILED DESCRIPTION OF THE PREFERRED EMBODIMENTS

Figure 1:
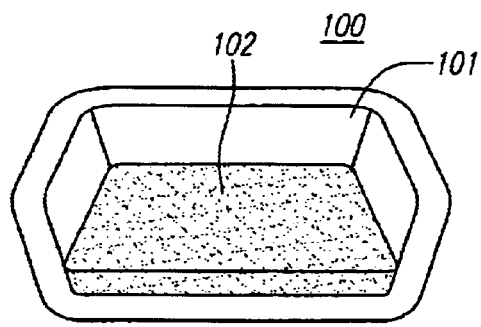
FIG. 1 illustrates a couch bed, having a frame and a cushion, in a standard configuration, in accordance with the present invention.

FIG. 1 shows a couch bed 100 according to the present invention. Couch bed 100 includes a frame 101 and a removable cushion 102. Frame 101 and cushion 102, in a preferred embodiment, are covered with a non-allergenic or hypoallergenic fabric covering. Preferably, the fabric cover is secured to frame 101 through the use of ties that run through frame 101. The fabric cover is secured for the purpose of maintaining the appearance of pet bed 100 and to minimize bunching of the fabric that may be uncomfortable for the pet.

Figure 2:
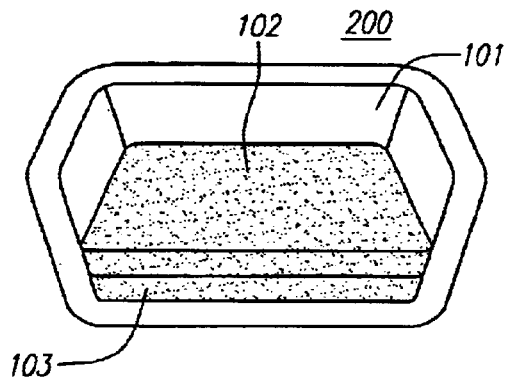
FIG. 2 illustrates a couch bed in accordance with an alternative embodiment.

FIG. 2 shows a pet couch bed 200 in accordance with an alternative embodiment of the present invention. Pet couch bed 200 includes frame 101, cushion 102, and a second cushion 103. Second cushion 103 is placed between frame 101 and cushion 102 while in the standard configuration.

Figure 3:
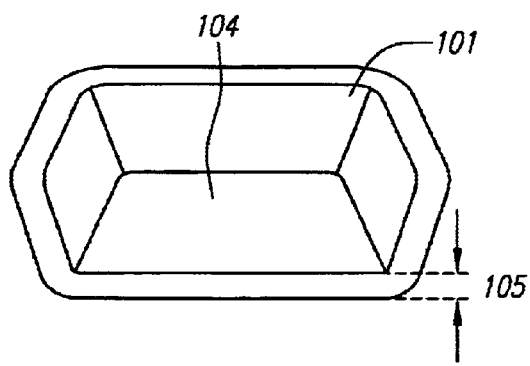
FIG. 3 illustrates the frame.

FIG. 3 shows frame 101 with cushions 102 and 103 removed therefrom. Frame 101 has a shelf surface 104 upon which cushion 102 or 103 may be placed, or a pet may sleep. Shelf surface 104 has a shelf height 105 from the bottom of frame 101. In a preferred embodiment, shelf height 105 is between 2 cm and 10 cm.

Figure 4:
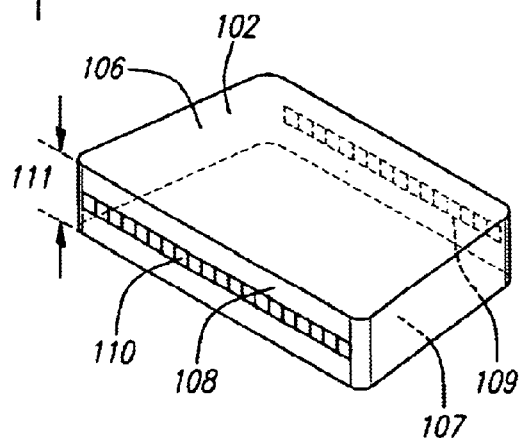
FIG. 4 illustrates the cushion.

FIG. 4 depicts cushion 102 comprising a major surface 106, a major surface 107 opposite to major surface 106, a minor surface 108 between 106 and 107, and a minor surface 109 opposite to minor surface 108. Cushion 102, and similarly cushion 103, may be either a contoured pillow having a convoluted surface, a pillow having a plurality of components of different densities, or a combination thereof. The multiple contours and multiple densities in concert with the orientation of cushion 102 serves to provide more variations of support and comfort to the pet. A preferred embodiment of the present invention uses a cushion having both varied densities and varied dimensions, such as that described by U.S. Pat. No. 6,182,312 B1, entitled "Orthopedic Head and Neck Support Pillow That Requires No Break-in Period", and is commercially available as the "Well-Pil-O." U.S. Pat. No. 6,182,312 B1 is incorporated herein.

Whether in the standard configuration of FIG. 1 or the expanded sleeping area configuration of FIG. 5, cushion 102 may be oriented with either major surface 106 or major surface 107 resting on shelf surface 104 or on a floor. Also, either minor surface 108 or minor surface 109 can be aligned with the front of frame 101. These orientation schemes allow for four possible surfaces for the pet to choose from in both the standard and expanded sleeping area configurations.

Similarly, FIG. 6 shows frame 101 and cushion 102 in the expanded sleeping area configuration in accordance with an alternative embodiment which also utilizes cushion 103 resting on shelf surface 104. Using cushion 103 provides a multitude of sleeping surfaces by changing the orientation of cushion 103 in frame 101, in a manner similar to that discussed above with reference to cushion 102.

FIG. 7 shows couch bed 100 in an expanded sleeping area configuration with tie strings 112 attached to frame 101, and tie strings 113 attached to cushion 102. Strings 112 and 113 are used to secure cushion 102 to frame 101 while in the expanded sleeping area configuration.

FIG. 8 and FIG. 9 show two additional preferred embodiments of couch bed 100 in the expanded sleeping area configuration. FIG. 8 depicts a cut-away side view of frame 101 and cushion 102. Shelf surface 104 has a shelf height 105 measured from the bottom of frame 101, and cushion 102 has a thickness 111 measured between major surfaces 106 and 107. In the embodiment shown in FIG. 8, shelf height 105 is substantially equal to cushion thickness 111. FIG. 9 shows an alternative embodiment in which cushion thickness 111 is shown to be greater than shelf height 105. These two embodiments provide different surface contours that may be preferable to different pets.

In a preferred embodiment, an optional hook-and-loop, e.g., VELCRO™, being a commercial example, fastener strip 114 is attached to a bottom of frame 101 adjacent to a front end of frame 101. Strip 114 is used to secure cushion 102 to frame 101 while in the expanded sleeping area configuration shown in FIGS. 5, 6, 8, and 9.

Referring to FIG. 8 and FIG. 9, cushion 102 is shown to have a hook-and-loop fastener strip 110 attached to a tab of the fabric covering of cushion 102 on surfaces 108 and 109, between surfaces 106 and 107. In the expanded sleeping area configuration, strip 110 can be attached to strip 114 as shown in the preferred embodiment of FIG. 8 and FIG. 9. Strips 114 and 110 are used to maintain the contact between frame 101 and cushion 102 while in the expanded sleeping area configuration, thereby maximizing comfort for the pet. In a preferred embodiment, the hook-and-loop fastener is utilized with strip 114 being the hook and strip 110 being the loop.

The present invention fills a need in the technology by providing not only aesthetically pleasing pet furniture, but a convertible couch bed that is specifically designed to offer the therapeutic support domesticated animals require. A preferred embodiment uses orthopedic pillows as cushions; these contoured pillows are constructed of a plurality of components of varying density. By lying on these pillows, pets are able to stretch muscles, gap joints, and support their bodies in much the same fashion as humans using orthopedic pillows when they sleep. The use of these pillows allows pets to minimize the effects of musculoskeletal dysfunctions and diseases, allowing them to live much happier and healthier lives.

The present invention provides a multitude of different sleeping surfaces for pets, thereby greatly increasing the chances that any given pet will be able to find one configuration that suits its needs. The different sleeping surfaces also provide a pet with the support that it may require to easy the pain of musculoskeletal discomfort. By increasing the chances that the pet will use the pet bed, the likelihood of the pet rejecting the bed, and the owner having purchased a useless bed, is greatly reduced.

What is claimed is:

1. A convertible couch bed, comprising:
   a frame having a front, a back, and a shelf;
   a first removable cushion having a plurality of components of different densities, arranged on said shelf of said frame in one configuration;
   a fabric cover for said frame; and
   a fabric cover for said first removable cushion;
   wherein said shelf of said frame has a height, and wherein said cushion has a thickness greater than said height of said shelf of said frame.

2. The convertible couch bed of claim 1, wherein said cushion is laid against said frame to form an expanded sleeping area in a second configuration.

3. The convertible couch bed of claim 2, further comprising a fastener, said fastener including a first strip attached to said frame and a second strip attached to said cushion, wherein said first and second strips can be used to attach said cushion to said frame in the desired configuration.

4. The convertible couch bed of claim 2, further comprising a first set of strings with one end fastened to said frame, and a second set of strings with one end fastened to said cushion, wherein said first and second sets of strings can be used to secure said cushion to said frame.

5. The convertible couch bed of claim 1, wherein said cushion is placed in said frame in one of a plurality of orientations.

6. The convertible couch bed of claim 1, further comprising a second cushion, wherein one of the first and second cushions is removably positioned adjacent to said shelf while the other of said first and second cushions is arranged on said shelf.

7. A bed, comprising:
   a frame, having a front, a back, and a shelf;
   a first removable cushion having a contoured surface arranged on said shelf of said frame in one configuration;
   a fabric cover for said frame; and
   a fabric cover for said first removable cushion;
   wherein said shelf of said frame has a height, and wherein said cushion has a thickness greater than said height of said shelf of said frame.

8. The bed of claim 7, wherein said cushion is laid against said frame to provide an expanded sleeping area in a second configuration.

9. The bed of claim 8, further comprising a fastener, said fastener including a first strip attached to said frame and a second strip attached to said cushion, wherein said first and second strips can be used to attach said cushion to said frame in the desired configuration.

10. The bed of claim 8, further comprising a first set of strings with one end fastened to said frame, and a second set of strings with one end fastened to said cushion, wherein said first and second sets of strings can be used to secure said cushion to said frame.

11. The bed of claim 7, wherein said cushion is laced in said frame in one of a plurality of orientations.

12. The bed of claim 7, further comprising a second cushion, wherein one of the first and second cushions is removably positioned adjacent to said shelf while the other of said first and second cushions is arranged on said shelf.

13. The bed of claim 12, wherein said first cushion and said second cushion further comprises:
- a plurality of components of different densities;
- a flat surface covering said plurality of components; and
- a contoured surface covering said plurality of components and opposite to said flat surface.

14. The bed of claim 12, wherein said first and second cushions are removably placed on said shelf of said frame in one of a plurality of orientations while in said one configuration, and said first cushion is removably placed on a floor in one of a plurality of orientations while in a second configuration.

15. The bed of claim 12, wherein said first cushion is attached to said frame while in said second configuration.

* * * * *